United States Patent [19]
Fajardo

[11] Patent Number: 6,163,347
[45] Date of Patent: Dec. 19, 2000

[54] METHOD AND APPARATUS FOR IMPROVING THE QUALITY OF A VIDEO IMAGE

[75] Inventor: Pedro E. Fajardo, Hillsboro, Oreg.

[73] Assignee: Intel Corporation, Santa Clara, Calif.

[21] Appl. No.: 08/995,229

[22] Filed: Dec. 19, 1997

[51] Int. Cl.[7] .................................................. H04N 5/21
[52] U.S. Cl. ............................ 348/625; 348/15; 348/584
[58] Field of Search ................................ 348/22, 24, 578, 348/625, 459, 15, 17–19, 584, 589, 448, 97; 382/255, 266, 274

[56] References Cited

U.S. PATENT DOCUMENTS 5,689,800  11/1997  Downs .

Primary Examiner—Victor R. Kostak
Attorney, Agent, or Firm—Blakely, Sokoloff, Taylor & Zafman LLP

[57] ABSTRACT

The present invention provides a technique for obtaining a sharp video image from a plurality of frames during a multimedia teleconference. Video data is acquired by a camera on a first processing system in the form of a number of frames. The frames are transmitted to a second processing system, which combines corresponding pixel values from each of a series of initial frames to produce an output frame. The process is repeated to generate a number of output frames, which are displayed on the second processing system.

24 Claims, 8 Drawing Sheets

METHOD AND APPARATUS FOR IMPROVING THE QUALITY OF A VIDEO IMAGE

FIELD OF THE INVENTION

The present invention relates generally to improvements in video systems, and more particularly, to improving the quality of a video image.

BACKGROUND OF THE INVENTION

The sharpening of video images using software may be of interest in many different applications. Applications in which such techniques might be desirable include, for example, multimedia teleconferencing, video surveying and medical imaging. Software enhancement of images may be of particular interest whenever video streaming techniques are employed.

Consider a video teleconferencing system, in which a corresponding system is implemented in the personal computers of each participant. Each system includes a small camera, which may be mounted on the monitor of each computer. Furthermore, each system includes appropriate video conferencing application software, such as the Proshare Video Conferencing System available from Intel Corporation of Santa Clara, Calif. Hence, an image of each participant of a video conference may be recorded while he is watching his monitor. The images are transmitted from a local system to a remote system over a suitable data link, such as telephone lines or an Integrated Services Digital Network (ISDN) link. As a result, images of some or all participants may be displayed on each monitor during a video conference.

In video conferencing systems, it is desirable to reduce the overall costs of the required hardware. Therefore, the video cameras should be as simple as possible. Hence, it may not be desirable to employ an autofocus mechanism. However, it is also undesirable to have to focus manually during a conference.

In order to understand existing video processing technology, it should first be noted that video images are commonly made up of fundamental picture elements, which are often referred to as pixels. In a simple example, pixels might appear either black or white and should be small compared to the full size of the image. As further illustrated in FIG. 2a, a two-dimensional, rectangular black box 200 in a white surrounding may be chosen as an object to be displayed. Hence, according to FIG. 2b, a sharp image 210 of the box 200 might consist of a plurality of black pixels 220 forming a two-dimensional, rectangular box surrounded by a plurality of white pixels 225. On the other hand, as indicated in FIG. 2c, a blurred (non-sharp) image 230 might consist of further, undesired black pixels 240 outside of an area 250 corresponding to the sharp image of the box 200, and some white pixels 245 inside of the area 250.

A sharper image might be obtained from an initial image by applying rules such as the following: take a first white pixel within a blurred image; compare the numbers of black and white pixels in the immediate neighborhood of the white pixel; change the first white pixel into a black pixel if there is a majority of black pixels in its immediate neighborhood; leave the first white pixel as it is if there is the same number or a majority of white pixels in the immediate neighborhood of the first white pixel. Further rules for pixels which are initially black can be obtained while swapping black and white in the above rules.

The above described method is illustrated in FIGS. 3a and b. According to FIG. 3a, within a initial, non-sharp image a first white pixel 300 is surrounded by five black pixels 310 and three white pixels 315. Hence, there is a majority of black pixels 315 in the initial neighborhood of the first white pixel 300. Therefore, the first white pixel 300 becomes changed to a black pixel 300'. In contrast, a second white pixel 320 is initially surrounded by four black pixels 330 and four white pixels 335 and therefore remains white. Once applying these rules on each pixel within the non-sharp image 230 of FIG. 2c, a relatively sharp image 350 may be obtained, as shown in FIG. 3b.

The method described above and other, similar prior art methods have the disadvantage of causing a general loss of information. As a result, video images of complex objects are likely to look different from the corresponding original objects. For example, small details might disappear due to the above described rules or, as another example, objects which should be in close proximity to each other might appear as a single object. In addition, the above method and certain other prior art methods are not particularly well-suited to video streaming. Hence, there is a need for a better method of improving the quality of video images for video streaming applications, such as multimedia teleconferencing.

SUMMARY OF THE INVENTION

The present invention includes a method for obtaining an improved image. Corresponding data from different frames out of a series of initial frames are combined, and an output frame is created from the combined data. Other features of the present invention will be apparent from the accompanying drawings and from the detailed description which follows.

BRIEF DESCRIPTION OF THE DRAWINGS

The present invention is illustrated by way of example and may be better understood by referring to the following description in conjunction with the accompanying drawings, in which like references indicate similar elements and in which:

FIG. 2b illustrates a sharp video image of the object of FIG. 2a;

FIG. 2c illustrates a non-sharp video image of the object of FIG. 2a;

FIG. 3b illustrates a result obtained using the technique of FIG. 3a;

FIGS. 4b–4f illustrate a series of non-sharp images of the object of FIG. 4a.

DETAILED DESCRIPTION

Figure 1A:
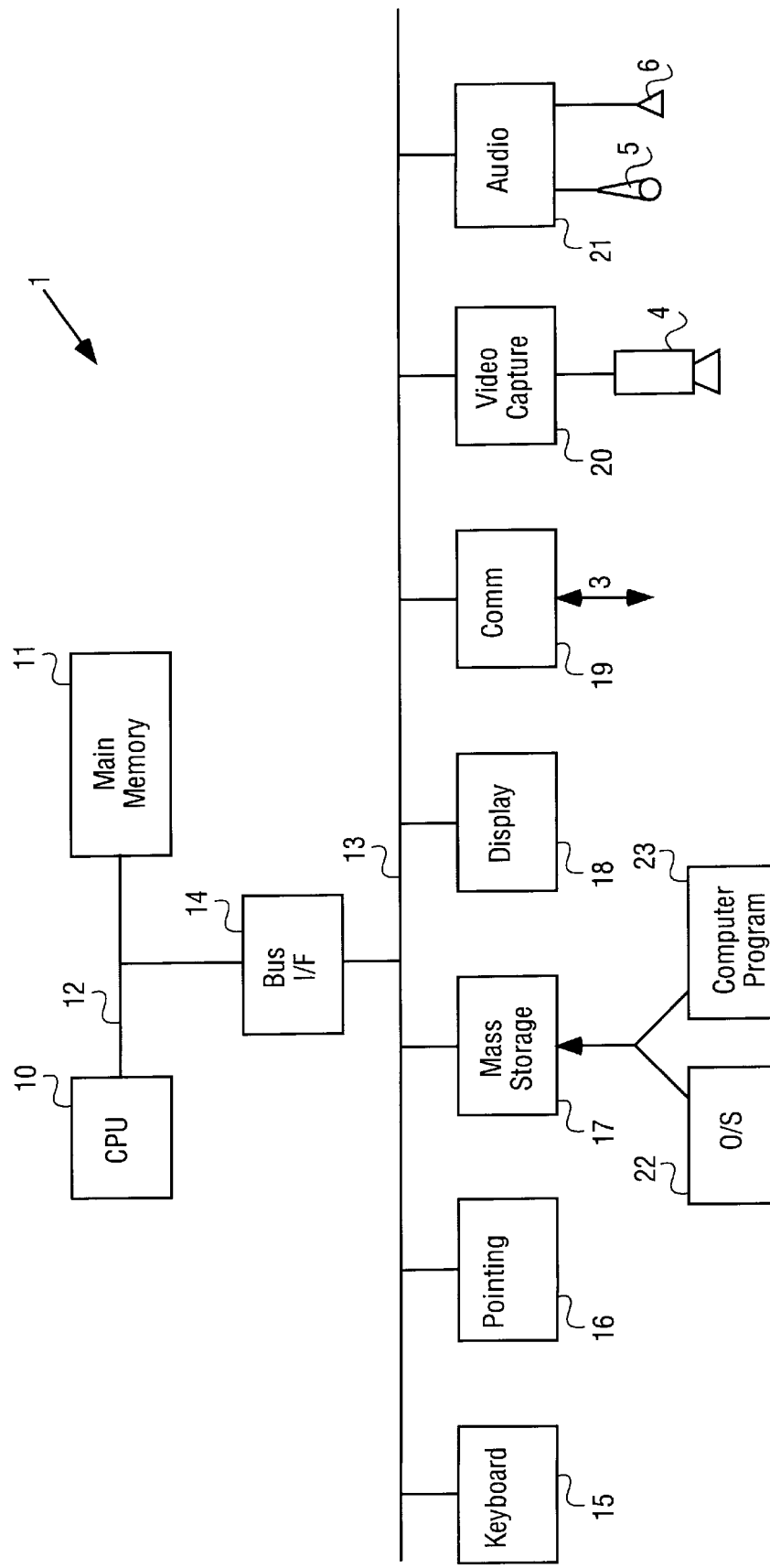
FIG. 1a is a system diagram illustrating a computer hardware environment in which the present invention can be implemented.

A technique for sharpening video images is described. In the following description, reference is made to the accompanying drawings which form a part hereof, and in which are shown by way of illustration one or more specific embodiments in which the invention may be practiced. It is to be understood that other embodiments may be utilized and structural changes may be made without departing from the scope of the present invention. Furthermore, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description.

Briefly, in accordance with the present invention, a multimedia teleconference is maintained by at least two participating computer systems. An initial sequence of frames is transmitted in real time from a first computer system to a second computer system. The second computer system combines data from different frames of the initial sequence to generate an output frame having sharpened images. The combining of data is repeated to generate multiple output frames representing a new video sequence, which the second computer system displays. Hence, the present invention allows a local computer system to sharpen and display images received from a remote computer system, without the need for manual focusing of the camera on the remote computer system or other user intervention, and without the need for additional hardware, such as an autofocus mechanism.

For simplicity, but without any limitations to the present invention, the expressions "image", "frame", "video sequence" and "video image" are used throughout this description in the following way: "image" refers to a picture of an object which is displayed on a screen or to a corresponding set of data, display list, or the like; "frame" refers to a full picture displayed on a screen or within any defined portion of a screen as well as to a corresponding set of data, display list, or the like (hence, a frame might include a single object or a plurality of objects within any surrounding); "video sequence" refers to a series of frames which are displayed or to be displayed one after another on the same screen or within the same portion of a screen; and, finally, "video image" refers to either an image or a frame or a video sequence when general properties of pictures obtained by a video technique are of interest.

It should be noted, however, that a frame might only include the image of a single object, in which case the expressions image and frame would have the same meanings. Alternatively, a frame might only include a portion of an image of an object or an image of a part of an object. Furthermore, a frame obtained by a video camera might include more and different information from the corresponding frame after any processing of its data or after applying any data compressing technique. In particular, it is well-known to one skilled in the art to remove information from a frame which does not differ from the foregoing frame. In this case, displaying a video sequence would mean receiving basic frames, obtaining secondary frames, each secondary frame based on a corresponding basic frame, and displaying the secondary frames instead of simply receiving and displaying frames.

FIG. 1a shows a computer hardware environment in which the present invention can be implemented. The present invention may be implemented in a computer system 1, wherein the computer system 1 includes a Central Processing Unit (CPU) 10 connected to main memory 11 by a system bus 12. Main memory 11 includes Random Access Memory (RAM) and may also include Read-Only Memory (ROM). The system bus 12 is coupled to a peripheral bus 13 via a bus interface 14. The bus interface 14 may include any of a number of well-known bridges, controllers, and/or adapters for linking buses 12 and 13, and for enabling the components of computer system 1 to communicate with each other. The peripheral bus 13 may be any of a number of well-known expansion buses, an example of which is the Peripheral Component Interconnect (PCI) bus. A number of components are connected to the peripheral bus 13, including a keyboard 15, a pointing device 16, a mass storage device 17, the display 18, and communication device 19. The pointing device 16 may be any device suitable for positioning a pointer on the display 18, such as a mouse, trackball, touchpad, stylus with light pen. The mass storage device 17 may include any device suitable for storing large volumes of data, such as a magnetic disk or tape, Magneto-Optical (MO) storage device, or any of numerous variations of Compact Disk (CD) based storage device (e.g., CD-ROM, CD-R, CD-RW) or Digital Versatile Disk (DVD) based storage device. The communication device 19 is any device suitable for enabling the computer system 1 to communicate audio, video and other data with remote computer systems via links 3. Accordingly, communication device 19 may be, for example, a conventional modem, an ISDN adapter, a Digital Subscriber Line (xDSL) adapter, or an Ethernet or other Local Area Network (LAN) adapter.

A video camera 4 is also coupled to the peripheral bus 13 via a video capture board 20. Similarly, a microphone 5 and speaker 6 are coupled to bus 13 via audio circuitry 21. Circuits 20 and 21 provide appropriate circuitry for interfacing the video and audio input/output components to the bus 13, such as analog-to-digital and digital-to-analog conversion, compression and decompression, and other standard functions which are well-known in the art.

It will be noted that the architecture illustrated in FIG. 1 is provided only for purposes of illustration and that numerous variations on this architecture can be used within the scope of the present invention. For example, in other embodiments some or all of the components shown as connected to the peripheral bus 13 might instead be connected in a daisy chain to a Universal Serial Bus (USB) or to a bus which conforms to the Institute of Electrical and Electronics Engineers (IEEE) standard known as "IEEE 1394–1995 Standard for a High-Speed Performance Serial Bus" (otherwise known as "IEEE 1394"). Such a bus may replace or supplement bus 13 in computer system 1.

In one embodiment of the present invention, an operating system 22 and a computer program 23 corresponding to a video conferencing application are stored in a computer-readable medium, such as main memory 11 or mass storage 17 or both. Further, the operating system 22 and the computer program 23 include instructions which, when read and executed by the computer 1, cause the computer 1 to perform the steps necessary to implement and/or use the present invention. Those of ordinary skill in the art will recognize that many modifications may be made to this configuration, including the number, size, and types of components, without departing from the scope of the present invention.

In one embodiment, steps according to the present invention are embodied in machine-executable software instructions, such as in computer program 23, and the present invention is carried out in a processing system by a processor, such as CPU 10, executing the instructions. In other embodiments, hardwired circuitry may be used in place of, or in combination with, software instructions to implement the present invention.

Figure 1B:
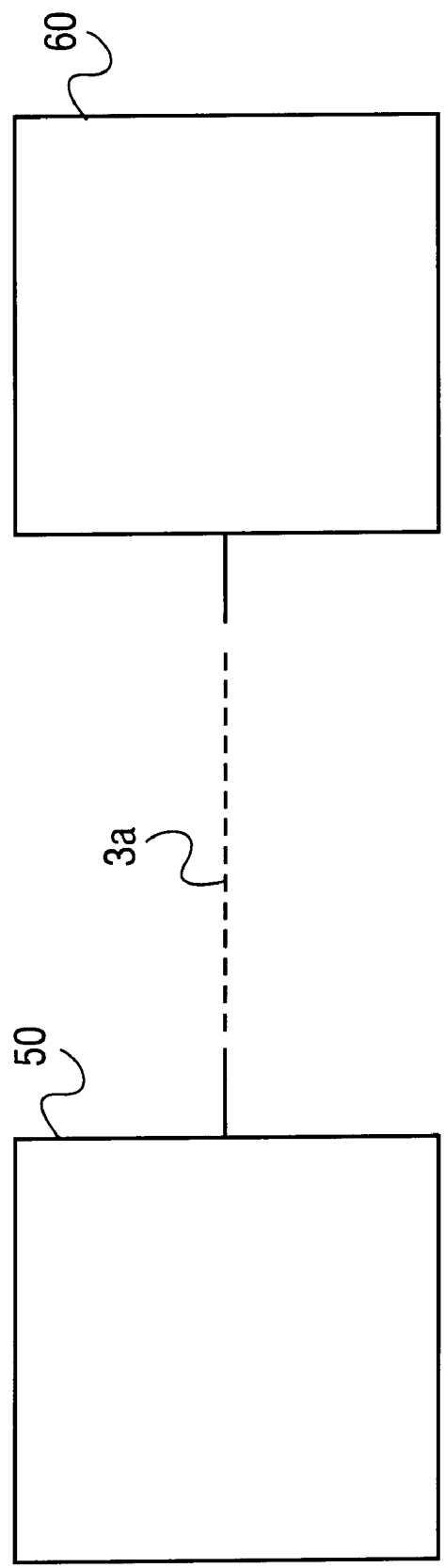
FIG. 1b is a system diagram illustrating a number of computer systems connected for a multimedia conference.
Figure 2A:
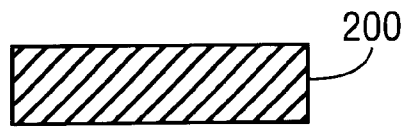
FIG. 2a illustrates an object to be displayed by a processing system.
Figure 2B:
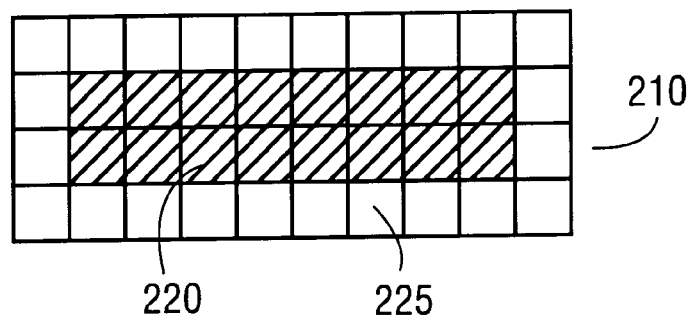
Figure 2C:
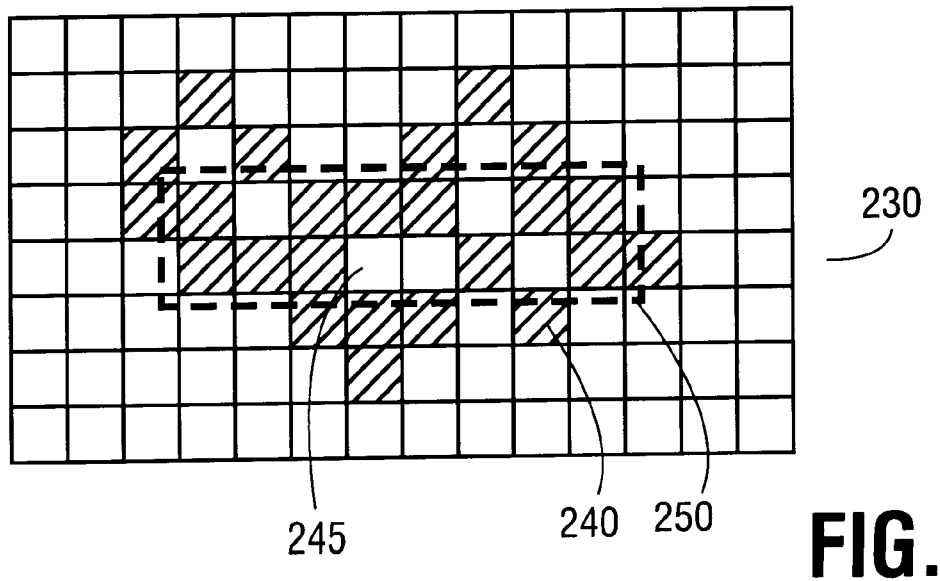
Figure 3A:
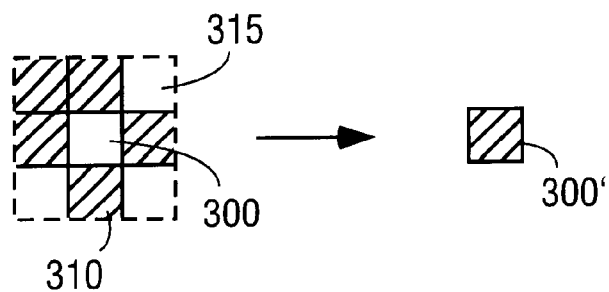
FIG. 3a illustrates the sharpening of an image according to a prior art technique.
Figure 3B:
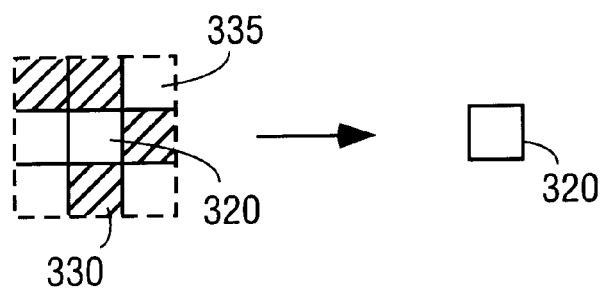
Figure 3B:
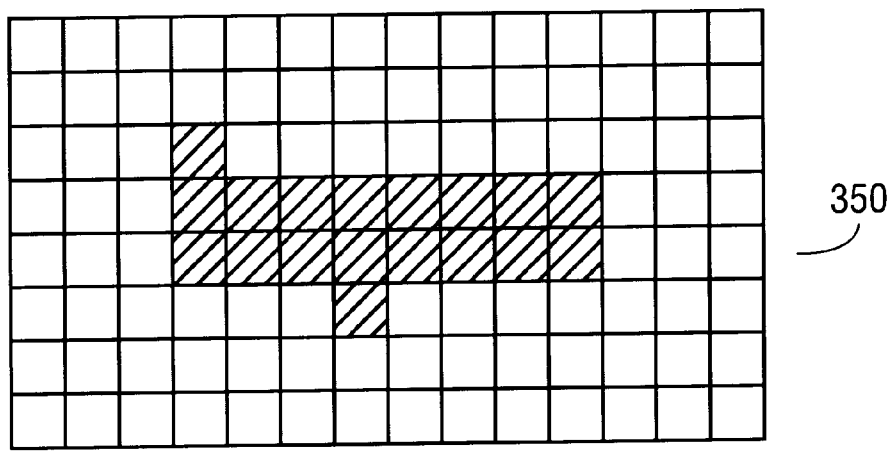

FIG. 1*b* illustrates two computer systems 50, 60 which are connected to each other via links 3*a*. Each of computer systems 50 and 60 might correspond to the above description. The links 3*a* can be any suitable type of links, such as telephone, ISDN, xDSL, Ethernet, etc. Note that instead of direct links 3*a*, there might be servers, multi-point conference units or any other computer systems forming part of the connection between the two computer systems 50, 60. Furthermore, there might be other computer systems connected to the two computer systems 50, 60 and to each other, while forming a computer network.

FIGS. 4*a*–4*f* and FIGS. 5–6 illustrate how a technique according to the present invention would deal with a simple but instructive situation. Hence, for simplicity of explanation but without any limitations to the present invention, the following assumptions are made: there is only a black, two-dimensional object on a white background to be displayed; the object does not move from frame to frame; and pixels of a frame including an image of the object are either black or white.

In contrast, a more complex situation might include multiple colored and three-dimensional objects to be displayed. In many situations, at least a part of the objects would move. Furthermore, each single pixel might have a more or less large range of different intensities. However, the same principles as described below might be applied to a corresponding complex situation.

Figure 4B:
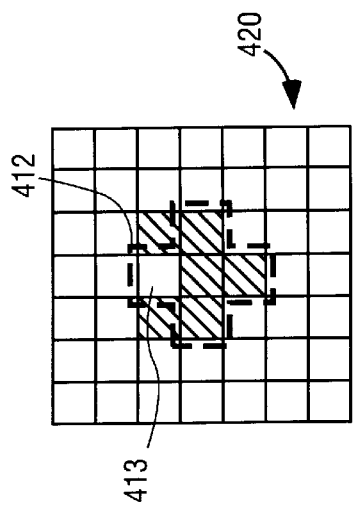
Figure 4C:
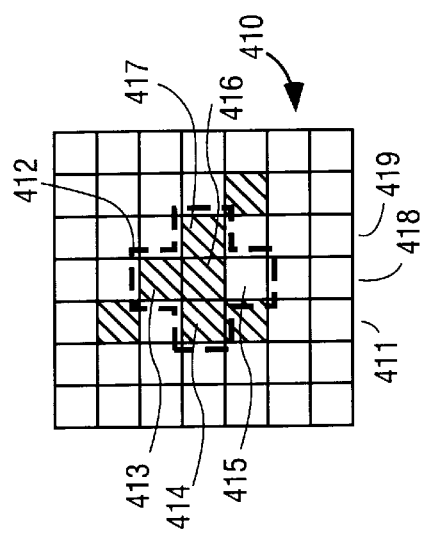
Figure 4A:
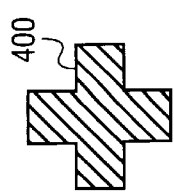
FIG. 4a illustrates an object to be displayed by a processing system.
Figure 4E:
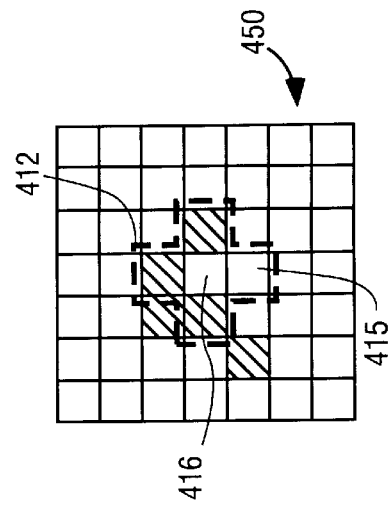
Figure 4F:
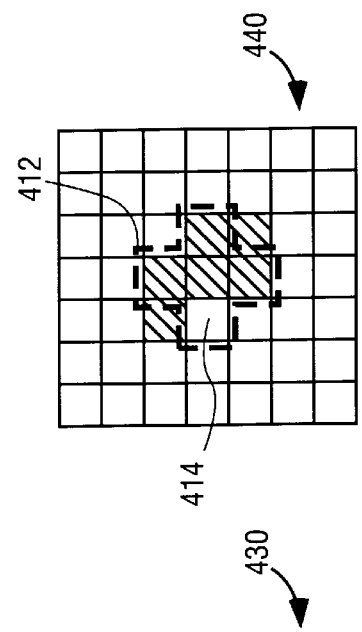
Figure 4D:
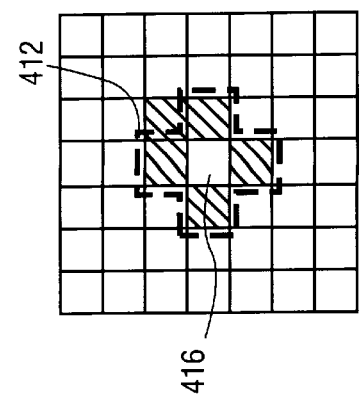

FIG. 4*a*, shows a two-dimensional object 400 as it should appear in a video image without blurring. In this example, the object 400 has a relatively simple shape, is black, and is fixed to a certain position and orientation relative to the video camera 4. Hence, a series of succeeding frames including images of the object 400 should not include any differences.

However, for various reasons, such as inadequate focusing of the camera, a corresponding image of the object 400 may appear blurred. A blurred image may mean that there are undesired black pixels outside of an area corresponding to a sharp image of the object 400, and some undesired white pixels inside the area, as described above. Note that a blurred image might be generated even though the object 400 is stationary, due to variations over time in the responses of the light-sensitive elements of the video camera (e.g., the charge-coupled devices). Furthermore, prediction of which particular pixels might appear incorrectly is difficult and may be impractical. Thus, in each frame different pixels may appear in an incorrect state. Hence, a series of succeeding frames including blurred images of the object 400 may include differences as noted above.

FIGS. 4*b* through 4*f* illustrate five consecutive frames of a video sequence depicting object 400. Consider now the first frame 410 as shown in FIG. 4*b*. The frame 410 consists of equally sized, square pixels which are arranged adjacently in columns and rows. An area which corresponds to a sharp image of the object 400 is indicated by a dashed cross 412. For simplicity, a poor resolution is selected and the dashed cross 412 comprises only five pixels 413, 414, 415, 416, 417. One of the five pixels (416) is centered and the remaining four 413, 414, 415, 417 are surrounding the centered pixel 416. In the picture of an analog watch the four remaining pixels 413, 414, 415, 417 might be referred to as 12-o'clock, 3-o'clock, 6-o'clock and 9-o'clock pixel, respectively. Hence, a central column 418 of pixels comprises the centered pixel 416, the 12-o'clock pixel 413 above and the 6-o'clock pixel 415 below the centered pixel 416. Furthermore, the neighboring columns 411, 419 comprise the 9-o'clock pixel 414 and the 3-o'clock pixel 417, respectively.

In the first frame 410, all pixels within the area of the dashed cross 412 are black except for the 6-o'clock pixel 415. On the other hand, in the neighborhood of the dashed cross 412 there are three further black pixels which should be white. In FIG. 4*c*, the 12-o'clock pixel 413 is white instead of black; in FIG. 4*d* the centered pixel 416; in FIG. 4*e* the 9-o'clock pixel 414; and in FIG. 4*f* the centered as well as the 6-o'clock pixel 416, 415. Furthermore, throughout the blurred images within the frames 420, 430, 440, 450 of FIGS. 4*c*, 4*d*, 4*e*, 4*f*, respectively, changing numbers of pixels neighboring to the dashed cross 412 area are black instead of white.

Figure 5:
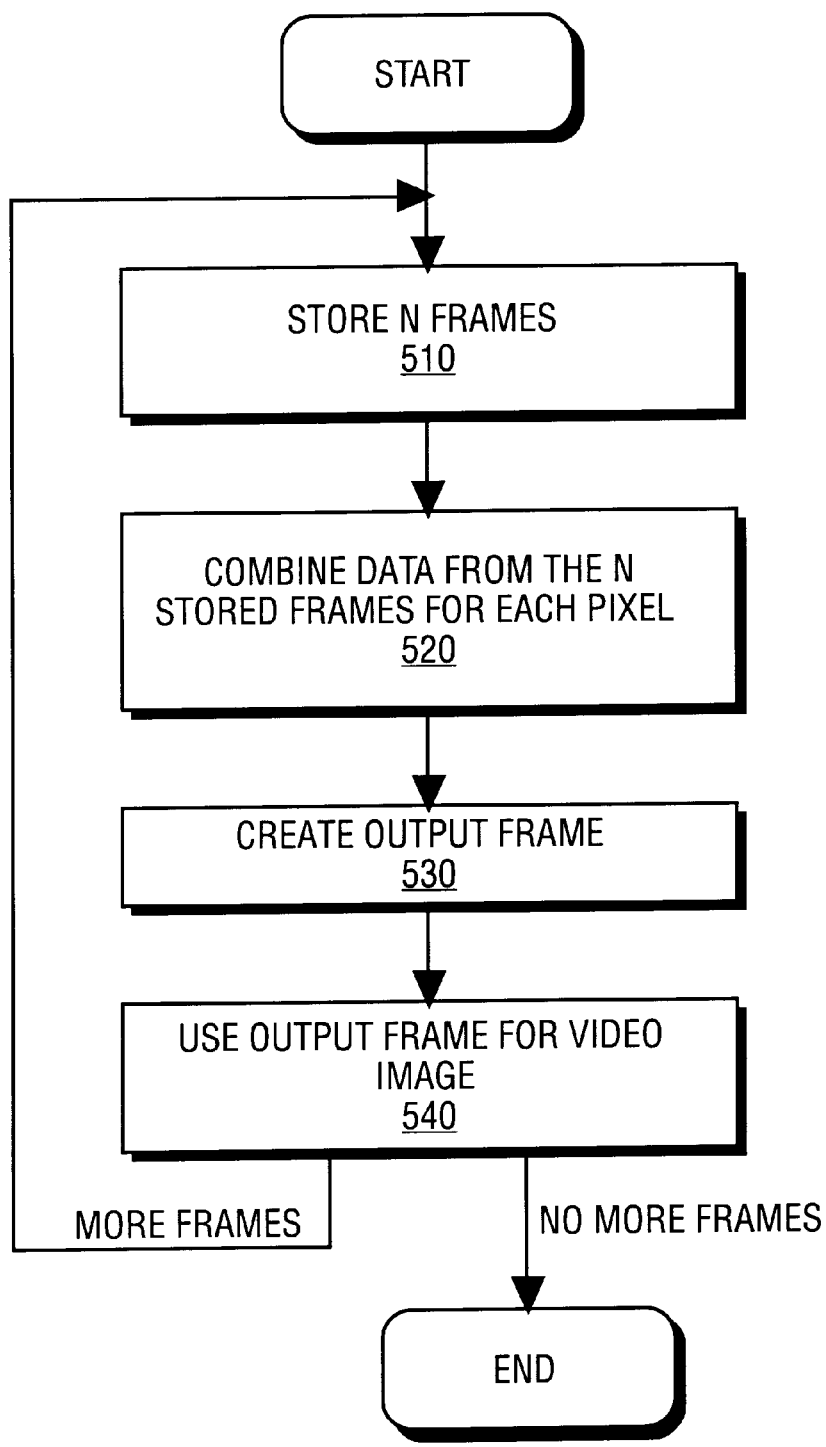
FIG. 5 is a flowchart illustrating a routine for sharpening an image according to the present invention.

FIG. 5 illustrates a routine for obtaining a sharp video image from multiple frames according to the present invention. The routine of FIG. 5 is performed by a local processing system, which may be a computer system participating in a video teleconference. The local processing system in that case may be a computer system which receives a video sequence that has been transmitted from another, remote processing system. Hence, the routine of FIG. 5 may be implemented by the local processing system as part of, or in conjunction with, the decompression and/or decoding of video received from the remote system. Alternatively, the local processing system may be the transmitting system, such that the routine of FIG. 5 is performed prior to transmission of the video sequence to a remote processing system. In that case, the routine of FIG. 5 may be implemented by the local processing system as part of, or in conjunction with, the compression and/or coding of video prior to transmission of the video to the remote system.

Referring to FIG. 5, at 510, N consecutive frames of the video sequence are stored, where N represents an integer greater than one. Note that "storing" in this context may refer to any way of temporarily maintaining the frames for a relatively short period of time (e.g. buffering). Thus, "storing" in this context is not inconsistent with the real time transfer of video images from one computer system to another, such as during a multimedia teleconference.

At 520, the data are combined for corresponding pixels (i.e., pixels occupying the same position within their respective frames) of each of the N stored frames. Depending on the number of stored frames and the possible states of the pixels, there are various possible ways of combining the data. For example, in the case of pixels which have any range of different intensities, the average intensity of each corresponding pixel throughout the stored frames might be obtained to generate an output pixel. In the case of an odd number of stored frames and pixels which are either black or white, the criterion might be the state in which each pixel appeared more often throughout the stored frames; in the case of an even number of stored frames and pixels which are either black or white, additional rules may be required if a pixel appeared black and white the same number of times. Numerous other ways of combining pixels from different frames are possible within the scope of the present invention.

Thus, at 530, an output frame is created comprising the combined data of the foregoing step. However, the output frame can be created in parallel to the step of data combining

520 while immediately using the combined data corresponding to each pixel. At 540, the output frame is used to generate a video image. If there are additional frames to process, an output video sequence comprising a plurality of output frames is generated by continuously repeating all steps 510, 520, 530, 540, until all frames have been processed. The output video sequence or any given frame of the output video sequence can be displayed on a monitor of the local computer system.

Thus, a sharper image is obtained without requiring manual focusing or other intervention by the user and without a substantial loss of information. It should be noted that the frame rate of the output video sequence will be reduced, according to the present invention, from that of the initial video sequence. However, the reduced frame rate can be compensated for by providing a sufficiently high initial frame rate.

The routine of FIG. 5 will now be described further with application to the example of FIGS. 4a–4f. In the storing step 510, the five consecutive frames 410, 420, 430, 440, 450 are stored. For each frame, the corresponding set of data includes information indicating which pixels within the frame would be either black or white. However, none of the five frames 410, 420, 430, 440, 450 need be displayed. Next, at 520, the data according to each corresponding pixel are combined. To this end, the number of times on which each individual pixel would have been black is compared to the number of times it would have been white. Depending on what had appeared more often in case of each individual pixel, the corresponding pixel will appear either black or white in the output frame of step 530.

Figure 6:
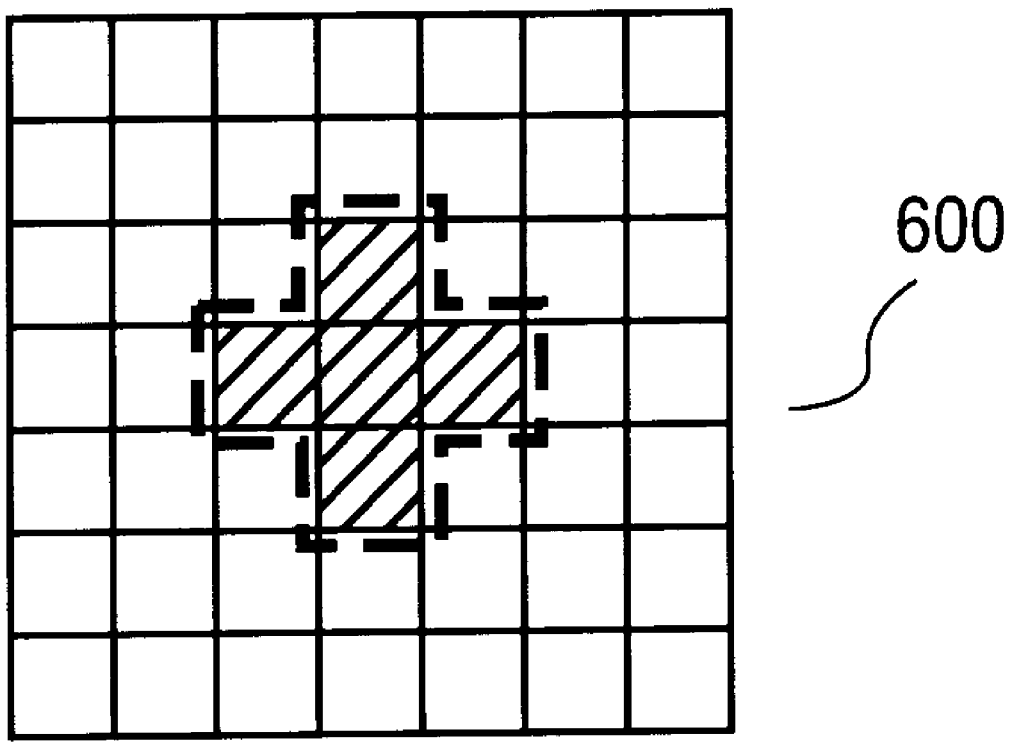
FIG. 6 is an example of an output image generated according to the present invention.

For example, for the five successive frames 410, 420, 430, 440, 450 in FIGS. 4b through 4f, respectively, the 12-o'clock pixel 413 would appear black four times and white one time, and, therefore, the corresponding pixel in the output frame would be black. In other words, each pixel will appear in the resulting image either black or white depending on what color it would had at least within three of the five subsequent images 410, 420, 430, 440, 450. Once the data have been combined for each pixel, at 540 a corresponding output frame 600 as shown in FIG. 6 is displayed. As a result, a single output frame 600 is created from the five initial frames 410, 420, 430, 440, 450. The output frame 600 replaces the five frames 410, 420, 430, 440, 450.

Those of ordinary skill in the art will recognize that many modifications may be made to the embodiment of the present invention as described above, without departing from the scope of the present invention. For example, instead of five consecutive frames, any other number might be used while implementing further rules, as needed, such as for an even numbers of frames. As a possibility, in the case of two frames, a pixel which appears one times black and one times white might be treated according to the states of the pixels surrounding it.

Figure 7:
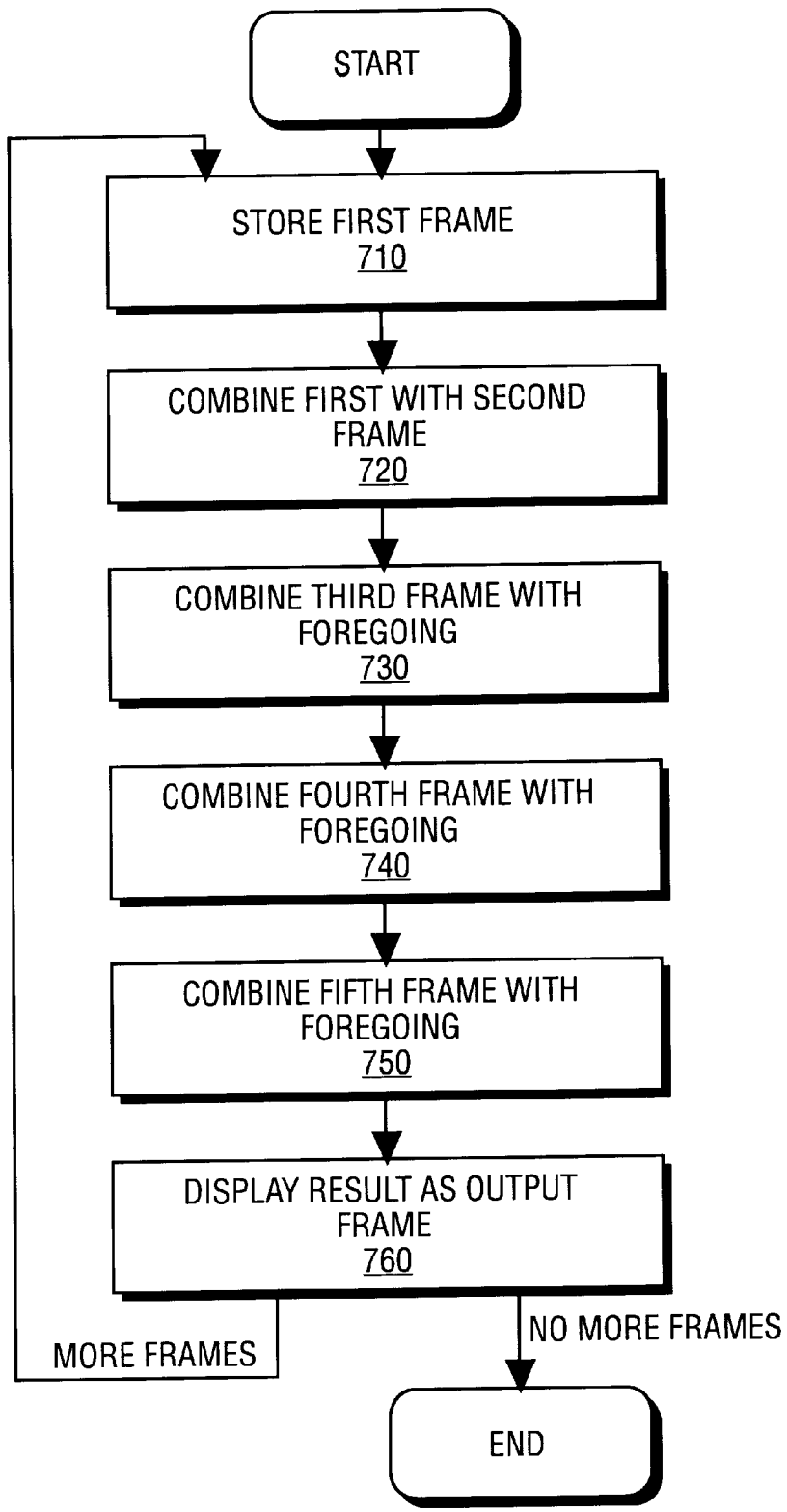
FIG. 7 is a flowchart illustrating a routine for sharpening an image according to the present invention.

In another embodiment of the present invention, instead of storing a number of input or initial frames first and then combining the pixel data, each incoming frame might be immediately combined with the foregoing, as illustrated by the routine of FIG. 7. Accordingly, a first frame is stored at 710. Then, at 720, a second frame is combined with the first frame to produce an output frame. To this end, in case of pixels which are either black or white, in each initial or input frame "white" might be indicated by a positive number and "black" by a negative number such as (+1) or (−1), respectively. As a result, by addition two times white will lead to (+2), two times black to (−2) and one times each to (0). Hence, in a resulting combined set of data (+2) corresponds to white, (−2) corresponds to black, whereas (0) means that there is (temporarily) no decision. After or during the combination, the data of the first frame which were stored at 710 are replaced by the combined data representing the output frame. Furthermore, similarly to the above described case, neither the first nor the second frame need be displayed.

In the example of FIG. 7, the foregoing procedure is repeated for three additional frames at 730, 740, 750, respectively, to progressively update the output frame. Note, however, that any other number of additional frames can be used instead of three. After each step, a resulting positive number for any pixel corresponds to white and a negative number to black. Hence, if a value corresponding to a certain pixel is either equal to (+3) or (−3) after the third frame, the following two frames may be neglected for this particular pixel since the sign of its corresponding number cannot be changed by the remaining two frames. Therefore, the amount of calculations employed is reduced. Furthermore, the output frame may be available for displaying earlier in comparison to the routine of FIG. 5. Hence, the output frame is displayed at step 760. If there are additional frames to process, an output video sequence comprising a plurality of output frames is generated by continuously repeating all steps 710 through 760, until all frames have been processed.

Thus, a technique for sharpening video images has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for obtaining an improved image, the method comprising:

a) combining corresponding data from different frames of a series of initial frames, the initial frames including an image; and b) creating an output frame from the combined data, such that the output frame includes an image corresponding to, but sharper than, the image in the initial frames.

2. The method of claim 1 further comprising:

c) repeating said combining (a) and said creating (b) to generate a plurality of output frames, the plurality of output frames representing a video sequence.

3. The method of claim 1, further comprising:

c) prior to said combining (a) and said creating (b), receiving the series of initial frames from a remote processing system.

4. The method of claim 1, further comprising:

c) repeating said combining (a) and said creating (b) on a local processing system on different series of initial frames received from a remote processing system to generate a plurality of output frames representing a video sequence; and d) displaying the video sequence on a display device of the local processing system.

5. The method of claim 4 wherein displaying the video sequence comprises displaying the output video sequence in real-time during a multimedia teleconference.

6. The method of claim 1 further comprising:

c) repeating said combining (a) and said creating (b) to generate a plurality of output frames representing a video sequence; and d) transmitting each output frame of the video sequence to a remote processing system, the video sequence for display on the remote processing system.

7. The method of claim 6 wherein the video sequence is for real-time display during a multimedia teleconference.

8. A method for obtaining an improved image, the method comprising:
   a) averaging data concerning a plurality of corresponding pixels within each of at least two frames of a series of frames; and
   b) using the averaged data to generate a plurality of corresponding pixels of an output frame to produce an image that is sharper than a corresponding image in said at least two frames.

9. The method of claim 8 further comprising:
   c) repeating said averaging (a) and said generating (b) to generate a plurality of output frames; and
   d) creating a video sequence from the plurality of output frames.

10. The method of claim 8 further comprising:
    c) prior to said averaging (a) and said generating (b), receiving the series of frames at a local processing system, the series of frames having been transmitted from a remote processing system, wherein said averaging (a) and said generating (b) are carried out on the local processing system; and
    d) displaying the output frame on the local processing system in real-time as part of a video sequence.

11. The method of claim 8 further comprising:
    c) repeating said averaging (a) and said generating (b) on a local computer system to generate a plurality of output frames forming a video sequence; and
    d) transmitting the video sequence from the local computer system to a remote computer system, the output frames of the video sequence for real-time display on the remote computer system.

12. A method for obtaining an improved video image, the video image including a plurality of pixels, each of which can have either of two states, the method comprising:
    a) collecting data concerning the states of a plurality of corresponding pixels within a plurality of frames out of a series of initial frames; and
    b) creating an output frame in which a pixel representing said corresponding pixels has a state based on the majority of states of the corresponding pixels within the plurality of frames, such that an image containing the pixel in the output frame is sharper than a corresponding image in the plurality of frames.

13. The method of claim 12 further comprising:
    c) repeating said collecting (a) and said creating (b) to generate a plurality of output frames; and
    d) creating a video sequence from the plurality of output frames.

14. The method of claim 12 further comprising:
    c) repeating said collecting (a) and said creating (b) to generate a plurality of output frames on a first computer system to generate a video sequence;
    d) transmitting each output frame of the video sequence from the first computer system to a second computer system; and
    e) displaying the output frames of the video sequence on the second computer system in real-time during a multimedia teleconference.

15. The method of claim 12 further comprising:
    c) receiving the series of initial frames at a first computer system from a second computer system prior to said collecting (a) and said creating (b);
    d) performing said collecting (a) and said creating (b) on the first computer system to generate a plurality of output frames to generate a video sequence; and
    e) displaying the output frames of the video sequence on the first computer system in real-time during a multimedia teleconference.

16. A method for obtaining a sharp video image from a plurality of frames during a multimedia teleconference, comprising:
    a) receiving at a first computer system a series of initial frames transmitted from a second computer system, the series of initial frames including an image;
    b) combining data from different frames out of the series of initial frames on the first computer system;
    c) creating an output frame from the combined data on the first computer system, such that the output frame includes an image corresponding to, but sharper than, the image in the series of initial frames;
    d) displaying the output frame on the first computer system in real time; and
    e) repeating steps a) through d) to generate and display a video sequence in real time on the first computer system.

17. A processing system configured to obtain a sharp video image from a plurality of video frames, the processing system comprising a processor and a memory coupled to the processor, the memory having stored therein instructions which, when executed by the processor, cause the processing system to:
    a) combine data from different video frames out of a series of initial video frames, the series of initial video frames including an image; and
    b) create an output video frame from the combined data, such that the output video frame includes an image corresponding to, but sharper than, the image in the series of initial video frames.

18. The processing system of claim 17, the memory having further stored therein instructions which, when executed by the processor, cause the processing system to repeat a) and b) on a plurality of series of initial video frames to generate a plurality of output video frames as a video sequence.

19. The processing system of claim 18, wherein the plurality of series of initial video frames have been previously generated on, and are received from, a remote processing system.

20. An article of manufacture for use in a computer system for configuring the computer system for obtaining a sharp video image from a plurality of frames, the computer system comprising a processor, the article of manufacture comprising a computer usable medium having computer readable program code means embodied in the medium, the program code means including instructions which when executed by the processor cause the computer system to:
    a) combine data from corresponding pixels of different frames out of a series of initial frames, the initial frames each including an image; and
    b) create an output frame which comprises the combined data, such that the output frame includes an image corresponding to, but sharper than, the image in the initial frames.

21. The article of manufacture of claim 20, further comprising a computer usable medium having computer readable program code means embodied in the medium, the program code means including instructions which when executed by the processor cause the computer system to:

c) obtain a plurality of output frames corresponding to a plurality of series of initial frames; and d) create a video sequence including the plurality of output frames.

22. The article of manufacture of claim 20, further comprising a computer usable medium having computer readable program code means embodied in the medium, the program code means including instructions which when executed by the processor cause the computer system to receive the series of initial frames from a remote computer system prior to combining the data.

23. A computer system configured for obtaining a sharp video image from a plurality of video frames during a multimedia teleconference, the computer system coupled to communicate with a second computer system during the teleconference, the computer system including a processor and a memory coupled to the processor, the memory having stored therein instructions which, when executed by the processor, cause the computer system to:

a) receive from the second processing system a series of initial video frames generated by the second processing system, wherein the series of initial frames includes an image;

b) combine data from different frames of the series of initial video frames to create an output video frame, such that the output video frame includes an image corresponding to, but sharper than, the image in the series of initial frames; and c) display the output frame on a display device in real-time as part of a video sequence.

24. A computer system configured for obtaining a sharp video image from a plurality of frames during a multimedia teleconference, the computer system connected to a computer network comprising at least a second computer system, the computer system comprising:

a) means for combining data from different frames out of a series of initial frames, wherein said different frames includes an image;

b) means for creating an output frame which comprises combined data, such that the output frame includes an image corresponding to, but sharper than, the image in said different frames;

c) means for immediately transmitting the output frame from the computer system to a second computer system to display the output frame on the second computer system; and d) means for creating a video sequence on the second computer system while continuously repeating the foregoing steps.

* * * * *